Patented Oct. 6, 1953

2,654,723

UNITED STATES PATENT OFFICE 2,654,723

POLYVINYL COMPOSITION AND METHOD OF MAKING SAME

Charles E. Greene, Akron, Ohio, assignor to The General Tire and Rubber Company, Akron, Ohio, a corporation of Ohio No Drawing. Application November 1, 1950, Serial No. 193,528

6 Claims. (Cl. 260—31.4)

This invention relates to a plasticized polyvinyl composition and to new plasticizers or softeners therefor. It particularly relates to plastized polyvinyl chlorides and plasticized copolymers of vinyl chloride and other vinyl compounds.

Various high boiling esters, such as tricresol phosphate, dioctyl phthalate and the like, have been used in vinyl resins. These materials are relatively expensive and have a tendency to bleed from the polyvinyl composition, particularly when they are subjected to contact with soap and water or when their surfaces are subjected to wiping.

An object of the present invention is to provide a plasticized polyvinyl chloride composition at lower cost and of improved properties.

Another object of the present invention is to provide a plasticizer for polyvinyl chloride and for copolymers of vinyl chloride with other vinyl compounds which is readily compatible with the vinyl compounds so that it does not bleed appreciably from the composition, is water-insoluble and has relatively high vapor pressure so as not to evaporate from the composition.

Another object of the present invention is to provide a film of plasticized polyvinyl halide having exceptional durability and good strength.

Other objects will be apparent from the following description of the invention.

Esters of monohydric alcohols with keto acids and esters of modified (previously partially esterified) polyhydric alcohols with keto acids have been proposed as plasticizers for cellulose derivatives. The esters of the lower alcohols of levulinic acids and other keto acids have not been considered to have any commercial value. I have found that the esters of the unmodified glycols and of the polyglycols with keto acids, such as levulinic and pyruvic acids, are excellent plasticizers for polyvinyl chloride and its copolymers, including the copolymers of vinyl chloride with one or more vinylidene chlorides, vinyl acetate and the like. Even polyvinylidene chloride may be plasticized by these diesters of polyhydric alcohols.

In the practice of the present invention the polyvinyl compounds, such for example as polyvinyl chloride, is combined with a glycol diester of the keto acid in any suitable way. The finely divided dry vinyl chloride may be mixed with one or more of these plasticizing compounds and the mixture heated at elevated temperatures, preferably about 300° F., to cause a homogeneous mixture to be formed. The polyvinyl chloride or its copolymer may be placed in suitable masticating apparatus and heated to a temperature of about 300° F. where it becomes plastic and one or more of the aforementioned esters added to the plastic mass a little at a time with mastication. One or more of the above plasticizers may also be incorporated into an aqueous dispersion or latex of the polyvinyl compounds by the means customary for the addition of other plasticizers. The ester of glycol with keto acids may constitute the sole plasticizer for the polyvinyl chloride or it may be present in admixture with one or more plasticizers, including both ester plasticizers and polymeric plasticizers such as copolymers of a diolefin with an acrylonitrile and/or methacrylonitrile, methylisopropenyl ketone and the like.

The plasticizers may be formed by the reaction of the keto acid or its anhydride or acid chloride with a glycol, such as ethylene glycol, diethylene glycol, hexylene glycol, 2-methyl-2,4-pentanediol and the like. The glycol used should have not in excess of eight carbon atoms and preferably not in excess of six carbon atoms unless it contains a substituent such as a keto group or ether oxygen. A keto ether, or acetyl radical in the glycol does not prevent compatibility with the vinyl resin. Thus, 2-methyl-2-acetyl-propanediol-1,3 (dimethylol methyl ethyl ketone) is also highly desirable for reaction with the keto acids. The glycol may be reacted with any monocarboxy keto acid of no more than eight carbon atoms, although those having less than six carbon atoms are preferred. Examples of suitable keto acids are levulinic acid, b-keto-butyric acid, mesitonic acid, pyruvic acid, keto butionic acid and keto hexonic acid.

The plasticizers of the compositions of the present invention have at least two hydroxyl groups of a polyhydric alcohol with two or three hydroxyl groups esterified with the keto acid or acids. The same keto acid is preferably used in esterification of both hydroxyl groups, although one of the hydroxyl groups may be esterified with one acid and the other with another. Of the above plasticizers a glycol dilevulinate including the dilevulinates of ethylene, diethylene, triethylene, hexylene and propane glycols are preferred and provide vinyl compositions with exceptional properties.

The following examples are given to illustrate the preparation of esters according to the present invention.

Example I 222 g. of levulinic acid
79 g. of diethylene glycol
310 cc. of toluene The above mixture is placed in a flask equipped with a reflux condenser and a Dean trap for removing water. The mixture is refluxed until 27 cc. (100 per cent theoretical) of water are removed. This requires about thirteen hours. The toluene is stripped and the residue distilled at reduced pressure. This yields 124 g. at 4 mm. pressure diethylene glycol dilevulinate boiling from 209° to 216° C. with a refractive index of 1.4572 at 25° C.

Diesters of ethylene glycol, hexylene glycol and other glycols as previously mentioned are prepared in the same way by substituting equal molar quantities of the glycols for the diethylene glycol in the above example. If mixed esters are desired, and indeed such frequently have advantages, part or all of the glycol in the above example may be substituted by an equal total number of moles of a plurality of glycols. Part or all of the levulinic acid may be substituted by an equivalent molar amount of one or more of the above keto acids if desired.

Polyvinyl compounds prepared in accordance with the present invention may contain from 5 to 75 or even 85 per cent by weight of the keto ester plasticizer, depending upon the particular keto ester used and the plasticity desired. In most cases, it is found that from 30 to 50 or 60 per cent by weight of the keto ester results in a very satisfactory compound when no other plasticizer is present. If other plasticizers are present, the total amount of plasticizer is usually not in excess of 85 per cent and less than 60 per cent is preferred. A substantial amount (at least 5 per cent) of the keto acid ester should be present to obtain benefits of the present invention.

The following example illustrates the compositions of the present invention:

Example II 20 g. powdered polyvinyl chloride
1 g. stabilizer (No. 3 advance)
10 g. diethylene glycol dilevulinate These compounds were roughly mixed together and then put on a mill with rolls heated to 300° F. The mixture was calendered to produce films .004 inch thick. The sheet or films of plasticized vinyl chloride so obtained was light in color, not disagreeable in odor, and of excellent "drape." The compatibility of plasticizer for the vinyl chloride is greater than that of dioctyl phthalate and the bleeding tendency was reduced.

In the above example the polyvinyl chloride may be substituted in whole or in part by polyvinylidene chloride, copolymers of vinyl chloride and vinyl acetate and other polyvinyl resins as desired to provide useful compositions.

The plasticizer (diglycol dilevulinate) in the above Example II may be substituted in whole or in part by other glycol dilevulinates as previously mentioned by diesters of one or more of these glycols with one or more of the keto acids having less than eight carbon atoms.

The diesters of the dihydric alcohols and levulinic acid having not more than six and preferably not more than three carbon atoms between oxygen groups of the glycol have exceptional compatibility for the polyvinyl resins and are comparatively easy to obtain. They are therefore preferred in the composition of the present invention.

It is understood that many other esters may be made in accordance with the present invention in addition to the above examples and may be employed as a polyvinyl plasticizer.

What I claim is:

1. A composition containing from 25 to 95 per cent of a solid polymeric vinyl chloride and 5 to 75 per cent of a diester of a monocarboxylic keto aliphatic acid of not in excess of five carbon atoms and of a glycol having less than eight carbon atoms and having only two hydroxyl groups both of which are on terminal carbon atoms.

2. A composition containing from 25 to 95 per cent polyvinyl chloride and from 5 to 75 per cent of a diester of levulinic acid and of a glycol which has two and only two hydroxyl groups both of which are on terminal carbon atoms and which has less than eight carbon atoms.

3. A composition according to claim 2 in which the glycol is a diglycol with not in excess of three carbons separating oxygen atoms.

4. A composition according to claim 2 in which the glycol is diethylene glycol.

5. A composition according to claim 2 in which the glycol is ethylene glycol.

6. A composition according to claim 2 in which the glycol is hexylene glycol.

CHARLES E. GREENE.

References Cited in the file of this patent

UNITED STATES PATENTS

| Number | Name | Date |
|---|---|---|
| 2,004,115 | Izard et al. | June 11, 1935 |
| 2,025,048 | Graves | Dec. 24, 1935 |
| 2,073,031 | Sly | Mar. 9, 1937 |
| 2,129,668 | Barrett et al. | Sept. 13, 1938 |
| 2,328,646 | Izard | Sept. 7, 1943 |
| 2,408,174 | Morey | Sept. 24, 1946 |